United States Patent [19]

Watanabe

[11] Patent Number: 4,680,502

[45] Date of Patent: Jul. 14, 1987

[54] INDEX TYPE COLOR PICTURE TUBE

[75] Inventor: Naomitsu Watanabe, Mobara, Japan

[73] Assignee: Hitachi, Ltd., Tokyo, Japan

[21] Appl. No.: 750,784

[22] Filed: Jul. 1, 1985

[30] Foreign Application Priority Data

Jun. 29, 1984 [JP] Japan ............................... 59-133103

[51] Int. Cl.[4] ........................ H01J 29/20; C09K 11/08

[52] U.S. Cl. .................................... 313/468; 313/471; 252/301.4 S

[58] Field of Search ............................... 313/468, 471; 252/301.4 S

[56] References Cited

U.S. PATENT DOCUMENTS

| | | | |
|---|---|---|---|
| 3,989,977 | 11/1976 | Ashizaki | 313/468 |
| 4,113,648 | 9/1978 | Ferri et al. | 252/301.4 S |
| 4,507,585 | 3/1985 | Inoue et al. | 313/471 |

OTHER PUBLICATIONS

*J. Electrochem. Soc.*, vol. 123, No. 1, pp. 75–78 and vol. 125, No. 2, pp. 305–312; "Enhancement of Cathodoluminescence Efficiency of Rare Earth Activated $Y_2O_2S$ by $Tb^{3+}$ or $Pr^{3+}$" and Synthesis and Luminescence Properties of Europium Activated Yttrium Oxysulfide Phosphors".

*Primary Examiner*—Palmer C. DeMeo
*Assistant Examiner*—Sandra L. O'Shea
*Attorney, Agent, or Firm*—Antonelli, Terry & Wands

[57] ABSTRACT

An index type color picture tube having a stripe type fluorescent screen with strips of a zinc sulfide-based green color phosphor, a zinc sulfide-based blue color phosphor, a red color phosphor which is a mixture of a $Y_2O_2S$:Eu phosphor containing not more than 2 ppm of Tb and a $Y_2O_3$:Eu phosphor, or a $Y_2O_2S$:Eu phosphor containing 5 to 30 ppm of Tb, and a phosphor for index detection has a uniform current-brightness characteristic of tricolor phosphors, and a less variation in white color tone of the picture reproduced over a range of from low current to high current.

6 Claims, 2 Drawing Figures

INDEX TYPE COLOR PICTURE TUBE

BACKGROUND OF THE INVENTION

This invention relates to an index type color picture tube, and more particularly a composition of phosphors constituting the fluorescent screen of the picture tube.

As is well known, the fluorescent screen of index type color picture tube generally comprises tricolor stripe shaped phosphor layers and a stripe shaped index phosphor layer adapted to show the position of a scanning beam. Used as the tricolor phosphors are a $Y_2O_3$:Eu phosphor for red color, a ZnS:Cu, Al or ZnS:Cu, Au, Al phosphor for green color, and a ZnS:Ag phosphor for blue color. Used as the index phosphor are a $YAlO_3$:Ce phosphor (for emitting ultraviolet rays) having a short after-glow time, a $Y_3Al_5O_{12}$:Ce phosphor (emitting green color) or a $Y_2SiO_5$:Cu phosphor (emitting ultraviolet rays), etc. However, with zinc sulfide type phosphors emitting green and blue colors, their brightness will generally increase substantially linearly with increase in the electron beam current within its low value range, but within the high value range, their brightness will saturate without exhibiting linear increase. Only with the conventional red color phosphor, even in the high current range, there occurs no appreciable saturation phenomenon of the brightness, and the brightness increases linearly as the electron beam current increases.

For this reason, in a color picture tube utilizing such tricolor phosphors, a white color picture becomes more reddish in the high current range than in the low current range, thus degrading uniformity of whiteness. With a shadow mask type color picture tube having three electron guns corresponding to the tricolor phosphors, this problem can be solved more simply by correcting characteristics of the associated electric circuits, but in the index type color picture tube having no shadow mask but having a single electron gun, it is quite difficult to take advantage of such a remedy. Thus, practical studies of green color phosphor and blue color phosphor having less saturation of brightness even in the high current range have been so far made, but those equivalent to the said phosphor of zinc sulfide system in the brightness and emission tone have not been obtained up to now.

To improve the brightness in the red color phosphor, it has been proposed to add about 5 to 30 ppm of Tb thereto [J. Electrochem. Soc. Vol. 123, No. 1, pages 75–78 (January, 1976); J. Electrochem. Soc., Vol. 126, No. 2, pages 305–312 (February, 1979)].

The applicants likewise proposed an index type color picture tube using a $Y_2O_2S$:Eu phosphor containing 0.01 to 3 ppm of Tb as a red color phosphor (Japanese patent application No. 58-123207; corresponding U.S. patent application Ser. No. 62,776, filed July 5, 1984now U.S. Pat. No. 4,625,147), where, contrary to the conventional concept that the characteristics of green color phosphor and blue color phosphor are made to approach those of the red color phosphor, the applicants tried to obtain a red color phosphor having a brightness saturation characteristic on the same level as those of the green color phosphor and the blue color phosphor, and succeeded in obtaining a remarkable brightness saturation characteristic by controlling the Tb content to a few ppm (Tb has been so far added to the red color phosphor in an amount of about 5 to 30 ppm to improve the brightness of the red color phosphor as described above). However, the applicants have found that it is practically difficult to obtain a red color phosphor whose impurity Tb content is exactly controlled to such a very small range as to directly show the brightness saturation characteristic on the substantially same level of those of the green color phosphor and the blue color phosphor to be used together in combination, owing to fluctuations in the contents of impurities in the phosphor raw materials, etc.

SUMMARY OF THE INVENTION

It is an object of the present invention to provide a novel index type color picture tube capable of improving uniformity of whiteness. According to the present invention, a phosphor mixture of $Y_2O_2S$:Eu phosphor containing not more than 2 ppm of Tb, and $Y_2O_3$:Eu phosphor or $Y_2O_2S$:Eu phosphor containing 5 to 30 ppm of Tb is used as a red color phosphor to attain the said object. That is, according to the present invention, a phosphor mixture of a $Y_2O_2S$:Eu red phosphor always containing Tb at an appropriate concentration of not more than 2 ppm, preferably 0.01 to 2 ppm, that is, a $Y_2O_2S$:Eu red color phosphor having a larger brightness saturation characteristic than those of the green color phosphor and the blue color phosphor, and a conventional $Y_2O_3$:Eu phosphor or $Y_2O_2S$:Eu red color phosphor having a linear current-brightness characteristic is used in place of the $Y_2O_2S$:Eu red color phosphate whose Tb content has been controlled to a very small range from 0.01 to 3 ppm in advance to obtain a red color phosphor having a brightness saturation characteristic on the substantially same level as those of the green color phosphor and the blue color phosphor.

A suitable mixing ratio of the $Y_2O_2S$:Eu red color phosphor containing not more than 2 ppm of Tb to the conventional red phosphor is selected in a range of 3:7 to 7:3 by weight in view of the brightness and the current-brightness characteristic of the individual red color phosphors and the brightness saturation characteristics of the green color phosphor and the blue color phosphor to be used in combination. Anyway, production of the desired red color phosphor can be made more simply, because it is not necessary to use a red color phosphor whose Tb content is exactly controlled to a desired value in said very small range from 0.01 to 3 ppm.

PREFERRED EMBODIMENTS OF THE INVENTION

Embodiments of the present invention will be described in detail below referring to the accompanying drawings.

Figure 1:
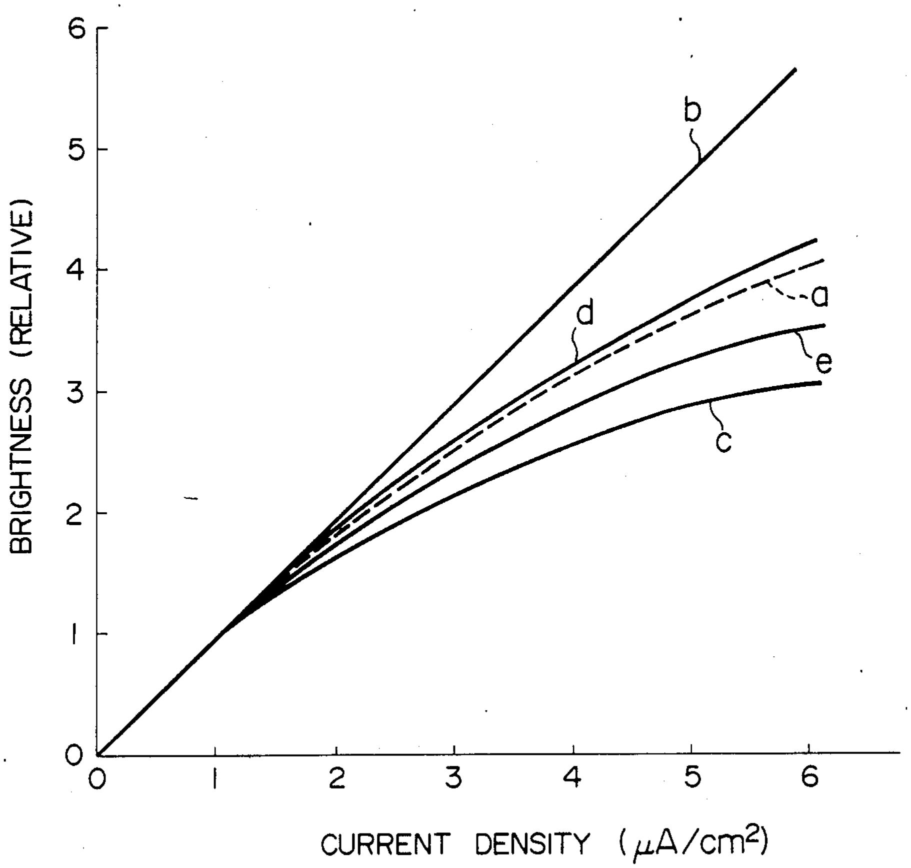
FIGS. 1 and 2 are diagrams showing current-brightness characteristics of phosphors.

FIG. 1 shows results of measuring current-brightness characteristics of various phosphors coated on the fluorescent screens of 1.5-inch type color picture tubes at an acceleration voltage of 7.5 kV within a luster scanning area of 5.7 $cm^2$, where a shows the results of the present $Y_2O_2S$:Eu red color phosphor mixture prepared by mixing a $Y_2O_2S$:Eu phosphor containing 0.2 ppm of Tb with a $Y_2O_2S$:Eu phosphor containing 20 ppm of Tb in a mixing ratio of 1:1 by weight, b those of a conventional $Y_2O_2S$:Eu red color phosphor containing 20 ppm of Tb, c those of a $Y_2O_2S$:Eu red color phosphor containing 0.2 ppm of Tb, d those of a ZnS:Cu, Au, Al green color phosphor so far usually used, and e those of a ZnS:Ag blue color phosphor, and the brightness on the axis of ordinate is shown as a relative value (ratio) to the brightness at the current density of 1 $\mu A/cm^2$.

As is obvious from FIG. 1, the present $Y_2O_2S$:Eu red color phosphor mixture has a brightness saturation characteristic on the same level as those of the green color phosphor and the blue color phosphor.

The present red color phosphor mixture can be prepared, for example, in the following manner.

To obtain a $Y_2O_2S$:Eu red color phosphor containing 0.2 ppm of Tb, 72.7 mg of $Y_2O_3$ having a purity of five nines and 4.22 g of $Eu_2O_3$ having a purity of three or four nines are dissolved in nitric acid, and then an appropriate quantity of $Tb(NO_3)_3$ solution is added to the nitric acid solution. The term "appropriate quantity" means such that Tb is ultimately contained in an amount of an atomic number ratio of $2\times10^{-7}$ (0.2 ppm) to the total number of cations (sum total of Y ions and Eu ions), and the appropriate quantity can be determined by measuring the content of Tb in the raw materials, particularly $Y_2O_3$, in advance.

Then, 150 g of oxalic acid is dissolved in 330 cc of deionized water, and the resulting oxalic acid solution is heated at about 85° C. and slowly added to the said solution of Y, Eu, and Tb likewise heated at about 85° C. with stirring. The resulting co-precipitated oxalates of Y, Eu and Tb are recovered by filtration, washed and then dried in air at a temperature of about 120° C. for 12 hours. The dried oxalates are subjected to pyrolysis at a temperature of 800° C. for about one hour to obtain an oxide thereof. Then, 22 g of the oxide is admixed with 10 g of sodium carbonate, 10 g of sulfur and 3 g of $k_2P_4$ and the mixture is charged into a quartz and 3 g of $K_2PO_4$ and the mixture is charged into a quartz crucible with a lid and clacined at a temperature of 1,180° C. for 3 hours. The calcined product is ground in a ball mill while adding water thereto, washed with water and then with dilute hydrochloric acid, and then subjected to precipitation, and the supernatant is thrown away by decantation. The foregoing operations are repeated.

Then, the resulting residues are screened through a 325-mesh sieve, and the screened residues are dried to obtain the desired phosphor.

The thus prepared red color phosphor is mixed with a conventional $Y_2O_2S$:E red color phosphor containing 20 ppm of Tb in a ratio of 1:1 by weight to obtain the desired red color phosphate mixture.

Stripe patterns of the said red color phosphor mixture, a ZnS:Cu, Au, Al green color phosphor and a ZnS:Ag blue color phosphor, and also a phosphor for detecting ultraviolet emission index are formed on the inside surface of a face plate according to the well known procedure, that is, by repetitions of coating, light exposure, and development. A color picture tube with the thus prepared face plate is produced.

Variation in the white color tone of the picture reproduced by the thus produced color picture tube is extremely small over a range of from low current to high current, whereby a picture of high quality can be obtained.

In the foregoing, description has been concentrated on the typical case of mixing the $Y_2O_2S$:Eu red color phosphor containing 0.2 ppm of Tb with the conventional red color phosphor containing 20 ppm of Tb. In the present invention, a $Y_2O_2S$:Eu red color phosphor containing not more than 2 ppm of Tb is mixed with a conventional red phosphor containing 5 to 30 ppm of Tb to obtain the desired red color phosphor mixture. A $Y_2O_3$:Eu red color phosphor so far usually used can be utilized as the conventional red color phosphor, whereby a desired red color phosphor mixture having an equivalent current-brightness characteristic can be obtained.

Figure 2:
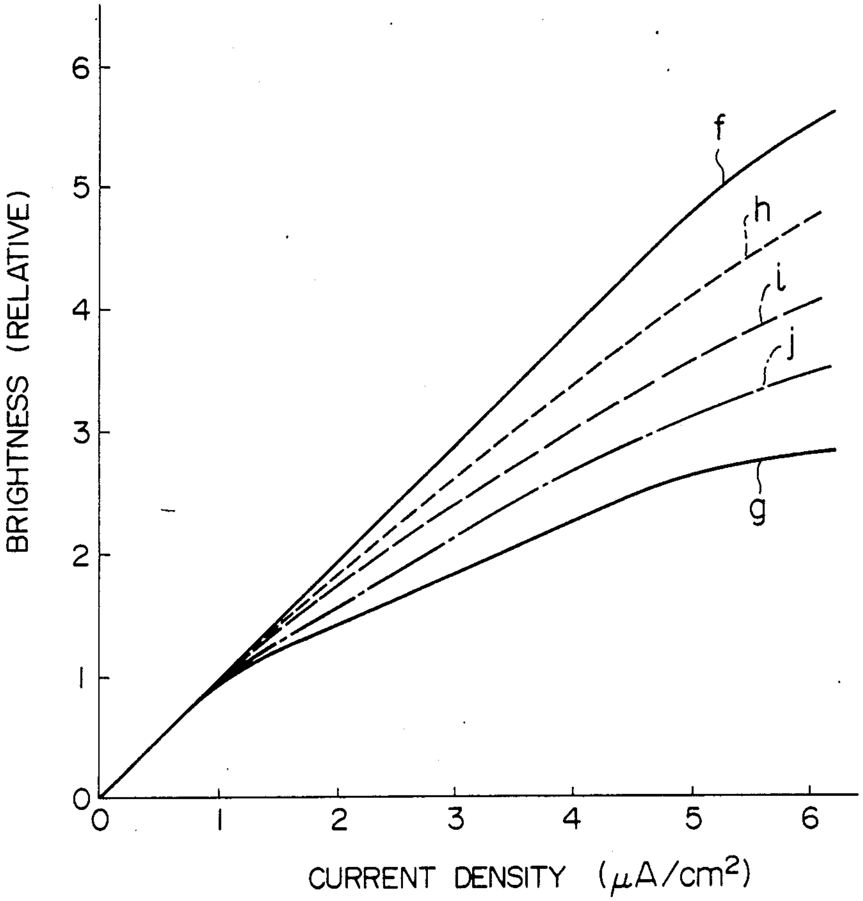

FIG. 2 shows results of evaluation of white color tone of the pictures reproduced by color picture tubes with face plates obtained by mixing the present red color phosphor prepared in the same manner as described above with a conventional $Y_2O_2S$:Eu red color phosphor containing 20 ppm of Tb in various mixing ratios, and coating the face plates of 1.5-inch color picture tubes with the resulting red color phosphor mixtures in the same manner as described above. Evaluation is made under the same conditions as mentioned in reference to FIG. 1.

In FIG. 2, f shows the results of the conventional red color phosphor, g those of the red color phosphor prepared in the same manner as described above, h, i, and j show those of the mixtures of the conventional red color phosphor shown by f and the red color phosphor shown by g, where h shows the results of a mixture in a mixing ratio of f to g of 7:3 by weight, i those of a mixing ratio of 5:5 by weight, and j those of a mixing ratio of 3:7 by weight, and it can be seen from FIG. 2 that current-brightness characteristics can be obtained substantially linearly with the mixing ratio, and the current-brightness characteristic that can be well matched with those of the ZnS:Cu, Au, Al green color phosphor and the ZnS:Ag blue color phosphor shown in FIG. 1 is obtained in the mixing ratio of 5:5 shown by i.

Then, stripe patterns of the red color phosphor mixtures shown in FIG. 2, a ZnS:Cu, Au, Al green color phosphor, and a ZnS:Ag blue color phosphor, and also a phosphor for detecting ultraviolet emission index are formed on the inside surfaces of face plates according to the well known procedure, that is, by repetitions of coating, light exposure and development. Color picture tubes with the thus prepared face plates are produced.

Variations in the white color tone of the pictures reproduced by the thus obtained index type color picture tubes are determined by changing the cathode current. The results are shown in the following Table, where white color tone values are shown for two current values of 1 $\mu A/cm^2$ and 6 $\mu A/cm^2$, and the "plus" sign in x shift increment shows a change of white color tone toward red color, and the "minus" sign a change of white color tone toward cyan color. It can be seen therefrom that the mixing ratio of the said red color phosphors that falls in $\Delta x$ of $\pm0.005$, that is, the range that the changes in white color tone are not noticeable to the naked eyes, is 7:3 to 3:7 by weight.

TABLE

| No. | Mixing ratio of red color phosphors by weight Tb:20 ppm | Tb:0.2 ppm | White color tone at 1 $\mu A/cm^2$ x | y | White color tone at 6 $\mu A/cm^2$ x | y | x shift increment $\Delta x$ |
|---|---|---|---|---|---|---|---|
| f | 10 | 0 | 0.280 | 0.330 | 0.297 | 0.325 | +0.017 |
| h | 7 | 3 | 0.275 | 0.330 | 0.280 | 0.323 | +0.005 |
| i | 5 | 5 | 0.281 | 0.333 | 0.281 | 0.330 | 0.000 |
| j | 3 | 7 | 0.270 | 0.332 | 0.265 | 0.323 | −0.005 |
| g | 0 | 10 | 0.270 | 0.337 | 0.260 | 0.320 | −0.010 |

The present invention is directed to an index type color picture tube, but can be also applied to a shadow mask type color picture tube, particularly a small size tube or a display tube having sizes of 1.5 to 5 inches, such as a tube having a high electron beam current density, for example, a tube with a narrow beam, where the present red color phosphor mixture can be effectively utilized for the same purpose as in the present invention.

As described above, the curren-brightness characteristic of tricolor phosphors can be made uniform in white color tone by using a red color phosphor mixture of a $Y_2O_2S$:E red color phosphor containing not more than 2 ppm of Tb and a conventional red color phosphor according to the present invention, and an index-type color picture tube with less variation in white color tone of the picture reproduced over a range of from low current to high current can be obtained in a simple manner in the present invention.

What is claimed is:

1. An index type color picture tube having a stripe type fluorescent screen with stripes of a zinc sulfide-based green color phosphor, a zinc sulfide-based blue color phosphor, a red color phosphor, and a phosphor for index detection, which comprises the red color phosphor being a mixture of a $Y_2O_2S$:Eu phosphor containing not more than 2 ppm of Tb and a $Y_2O_3$:Eu phosphor, or a $Y_2O_2S$:Eu phosphor containing 5 to 30 ppm of Tb.

2. An index type color picture tube according to claim 1, where the $Y_2O_2S$:Eu phosphor containing not more than 2 ppm of Tb has a Tb content of not less than 0.01 ppm.

3. An index type color picture tube according to claim 1, wherein a mixing ratio of the $Y_2O_2S$:Eu phosphor containing not more than 2 ppm of Tb to the $Y_2O_3$:Eu phosphor or the $Y_2O_2S$:Eu phosphor containing 5 to 30 ppm of Tb is 7:3 to 3:7 by weight.

4. An index type color picture tube according to claim 3, wherein the mixing ratio is 1:1 by weight.

5. An index type color picture tube according to claim 3, wherein the red color phosphor is a mixture of a $Y_2O_2S$:Eu phosphor containing not more than 2 ppm of Tb and a $Y_2O_3S$:Eu phosphor containing 5 to 30 ppm of Tb.

6. An index type color picture tube according to claim 3, wherein the red color phosphor is a mixture of a $Y_2O_2S$:Eu phosphor containing 0.2 ppm of Tb and a $Y_2O_3$:Eu phosphor containing 20 ppm of Tb.

* * * * *